United States Patent Office 3,522,265
Patented July 28, 1970

3,522,265
1,2-BENZISOTHIAZOLONE ANTIMICROBIAL PREPARATIONS
Herbert Klesper, Cologne-Flittard, Fritz Steinfatt, Opladen, Walter Lorenz, Wuppertal-Vohwinkel, and Klaus Langheinrich, Leverkusen, Germany, assignors to Farbenfabriken Bayer Aktiengesellschaft, Leverkusen, Germany, a corporation of Germany
No Drawing. Filed Nov. 1, 1965, Ser. No. 505,961
Claims priority, application Germany, Nov. 10, 1964, 1,215,304
Int. Cl. C07d 91/10
U.S. Cl. 260—304    3 Claims

ABSTRACT OF THE DISCLOSURE

Antimicrobial preparations obtained by heating 1,2-benzisothiazolones or N-hydroxyalkyl-1,2-benzisothiazolones with paraformaldehyde under alkaline conditions.

---

The present invention relates to antimicrobial preparations; more particularly it concerns antimicrobial preparations obtained by heating a 1,2-benzisothiazolone compound of the general formula

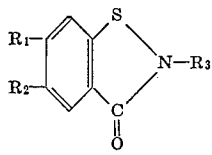

in which $R_1$ and $R_2$, independently of one another, stand for hydrogen or halogen and $R_3$ denotes hydrogen or hydroxyalkyl, for example, hydroxymethyl and hydroxyethyl, with paraformaldehyde at 90 to 150° C. in organic solvents. Those preparations are to be preferred, which are produced from a 1,2-benzisothiazolone compound of the above formula and paraformaldehyde in the ratio of 1 mol 1,2-benzisothiazolone compound to 0.5 to 3 mol formaldehyde in the presence of alkali hydroxide and with the use of water-miscible organic solvents.

Examples of suitable organic solvents are: ethylene glycol, diethylene glycol, propylene glycol and the monoethers obtained from these glycols and lower monohydric alcohols, such as ethyl alcohol and propyl alcohol.

The antimicrobial preparations of the present invention are particlarly suitable for disinfectant dry cleaning and for the bacteriostatic finish of textiles. The necessary amounts can easily be determined by preliminary experiments; for dry cleaning, an addition of 4 g. of the preparations per litre cleaning liquor will generally be sufficient, while for the bacteriostatic finish of textiles an addition of 4% of the preparations, referred to the weight of the textiles, is usually adequate. It is noteworthy that the antimicrobial preparations of the present invention are also eminently suitable for the preservation of boring oil emulsions and other emulsions which are prone to attack by microbes.

The following examples serve to illustrate the invention without, however, limiting its scope; the parts given are parts by weight.

EXAMPLE 1

Fabrics of wool, cotton, polyacrylonitrile fibres or synthetic polyamide fibres which are infected with Stc. aureus, Bct. coli, Bct. proteus, Bct. pyocyaneum and Stc. glycerinaceous are subjected for 20 minutes to a conventional dry cleaning in a liquor ratio of 1:13 in perchloroethylene or heavy benzine containing, per litre, 5 g. of a commercial cleaning intensifier based on anion-active and non-ionic tensides, as well as 4 g. of the antimicrobial preparation described below. The relative atmospheric humidity in the vapour chamber of the cleaning unit is 75%. The fabrics are subsequently centrifuged and dried. The fabrics are then found to be free from germs; they also have a bacteriostatic and fungistatic finish.

The antimicrobial preparation employed was produced as follows:

200 parts 1,2-benzisothiazolone were dissolved in 610 parts ethylene glycol monopropyl ether with the addition of 80 parts 45% sodium hydroxide solution while warming; 60 parts paraformaldehyde were then added, and the mixture was heated at 115° C. for 20 minutes. 5 parts cyclohexanone were finally added to the solution.

Fabrics which are infected with the above microbes and dry-cleaned without the addition of the preparation according to the invention are not sterile after the cleaning.

EXAMPLE 2

The procedure is as described in Example 1, but with the difference that, instead of the antimicrobial preparation there described, one of the two antimicrobial preparations is used, which were produced in the following way:

(a) 200 parts N-hydroxymethyl-1,2-benzisothiazolone were dissolved in 692 parts ethylene glycol monopropyl ether with the addition of 64 g. 45% sodium hydroxide solution while warming, 44 parts paraformaldehyde were then added, and the mixture was heated at 115° C. for 20 minutes.

(b) 200 parts 5-chloro-1,2-benzisothiazolone were dissolved in 685 parts ethylene glycol monoethyl ether with the addition of 65 parts 45% sodium hydroxide solution while warming, 50 parts paraformaldehyde were then added, and the mixture was heated at 110° C. for 15 minutes.

The fabrics thus treated are free from germs and have a bacteriostatic and fungistatic finish.

EXAMPLE 3

Fabrics of wool or synthetic polyamide fibres are treated for 30 minutes in an aqueous bath at 50° C. in a liquor ratio of 1:15 with the addition of 4% of the antimicrobial preparation described in Example 1 and 1% formic acid (each referred to the weight of the fabrics), and subsequently dried. The fabrics have then an excellent bacteriostatic and fungistatic finish; this finish is retained after several washings.

EXAMPLE 4

2 parts of a commercial boring oil consisting of white oil and an anion active emulsifier are stirred with 98 parts water to give an emulsion and subsequently mixed, while stirring, with 0.2 part of one of the antimicrobial preparations described in Examples 1 and 2. The emulsion is then excellently preserved, whereas the emulsion prepared without the addition of one of the antimicrobial preparations, shows a strong infection with bacteria already after a few days, when employed in the usual manner.

What is claimed is:
1. A composition obtained by contacting and heating about 1 mole of a compound of the formula

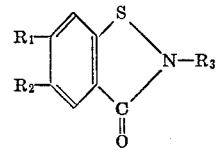

in which
$R_1$ and $R_2$ are members selected from the group consisting of hydrogen and halo; and R₃ is a member selected from the group consisting of hydrogen and hydroxy lower alkyl;

with about .5–3 mole paraformaldehyde; effecting the reaction in the presence of alkali hydroxide under alkaline conditions at a temperature of about 90–150° C. in a water miscible organic solvent.

2. The product of claim 1 wherein the water-miscible solvent is a member selected from the group consisting of ethylene glycol, diethylene glycol, propylene glycol, and corresponding monoethers thereof with a lower alkanol.

3. The product of claim 1 wherein formaldehyde is reacted with 1,2-benzisothiazolone dissolved in ethylene glycol monopropyl ether.

References Cited

UNITED STATES PATENTS 2,373,136   4/1945   Hoover et al. _____ 260—309.7

FOREIGN PATENTS 219,596   2/1962   Austria.

HENRY R. JILES, Primary Examiner

M. TROUSOF, Assistant Examiner

U.S. Cl. X.R.

117—138.5; 252—8.5, 106; 424—270